(12) United States Patent
Kwak et al.

(10) Patent No.: US 10,038,172 B2
(45) Date of Patent: Jul. 31, 2018

(54) RECHARGEABLE BATTERY

(71) Applicant: SAMSUNG SDI CO., LTD., Yongin-si, Gyeonggi-do (KR)

(72) Inventors: Seungho Kwak, Yongin-si (KR);
Sangwon Byun, Yongin-si (KR);
Yongchul Seo, Yongin-si (KR);
Sangkyoon Park, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 196 days.

(21) Appl. No.: 14/930,437

(22) Filed: Nov. 2, 2015

(65) Prior Publication Data

US 2016/0336581 A1 Nov. 17, 2016

(30) Foreign Application Priority Data

May 14, 2015 (KR) .......................... 10-2015-0067282

(51) Int. Cl.
| | |
|---|---|
| *H01M 2/06* | (2006.01) |
| *H01M 2/30* | (2006.01) |
| *H01M 2/26* | (2006.01) |
| *H01M 2/34* | (2006.01) |
| *H01M 2/04* | (2006.01) |

(52) U.S. Cl.
CPC ............... *H01M 2/06* (2013.01); *H01M 2/26* (2013.01); *H01M 2/30* (2013.01); *H01M 2/34* (2013.01); *H01M 2200/103* (2013.01)

(58) Field of Classification Search
CPC .......... H01M 2/348; H01M 2/06; H01M 2/04
See application file for complete search history.

(56) References Cited

U.S. PATENT DOCUMENTS

| | | | |
|---|---|---|---|
| 2012/0258356 A1* | 10/2012 | Kim ..................... | H01M 2/06 429/179 |
| 2012/0263976 A1 | 10/2012 | Byun et al. | |
| 2014/0234673 A1 | 8/2014 | Byun et al. | |
| 2014/0315052 A1 | 10/2014 | Byun et al. | |

FOREIGN PATENT DOCUMENTS

| | | |
|---|---|---|
| KR | 10-2012-0118315 A | 10/2012 |
| KR | 10-2014-0104187 A | 8/2014 |
| KR | 10-2014-0124618 A | 10/2014 |

* cited by examiner

*Primary Examiner* — Matthew J Merkling
(74) *Attorney, Agent, or Firm* — Lewis Roca Rothgerber Christie LLP

(57) ABSTRACT

A rechargeable battery includes an electrode assembly having a first electrode tab and a second electrode tab; a first current collection plate electrically connected to the first electrode tab; a case accommodating the electrode assembly; a cap assembly including a cap plate sealing the top-end opening of the case; a connecting pin located between the first current collection plate and the cap plate and electrically connecting the first current collection plate and the cap plate; and a first terminal unit electrically contacting the first current collection plate and protruding through the cap plate.

9 Claims, 3 Drawing Sheets

RECHARGEABLE BATTERY

CROSS-REFERENCE TO RELATED APPLICATION

This application claims priority to and the benefit of Korean Patent Application No. 10-2015-0067282 filed on May 14, 2015 in the Korean Intellectual Property Office, and all the benefits accruing therefrom under 35 U.S.C. 119, the entire contents of which are herein incorporated by reference.

BACKGROUND

1. Field

The present invention relates to a rechargeable battery.

2. Description of the Related Art

Unlike primary batteries which cannot be recharged, rechargeable secondary batteries can be repeatedly charged and discharged. Low capacity batteries that use single battery cells may be used as power sources for various small portable electronic devices such as cellular phones or camcorders. High power batteries may be used as power sources for driving motors of hybrid vehicles or the like.

Rechargeable batteries are manufactured in various shapes and representative shapes thereof may include a cylindrical shape and a prismatic shape. The rechargeable battery is generally configured by accommodating an electrode assembly having a positive electrode plate and a negative electrode plate and a separator as an insulator located therebetween in a battery case with an electrolyte and installing a cap plate in the battery case. Sometimes, positive and negative electrode terminals are connected to the electrode assembly and are exposed and protruded to the outside through the cap plate.

When an external short circuit, over-charge or damage due to penetration occurs to the rechargeable battery, the rechargeable battery may ignite or explode. Accordingly, there is a demand for a rechargeable battery configured to have improved safety.

SUMMARY

Embodiments of the present invention provide a rechargeable battery which can be driven by different current levels and includes two fuses capable of preventing short-circuit current from flowing between the inside and the outside, thereby improving safety of the rechargeable battery.

Embodiments of the present invention also provide a rechargeable battery, which can prevent short-circuit current from flowing to the outside of each of a plurality of rechargeable batteries connected to each other using a second fuse driven by a relatively low current level, thereby improving safety of the plurality of rechargeable batteries.

The above and other aspects of the present invention will be described in or be apparent from the following description of exemplary embodiments.

According to an aspect of the present invention, there is provided a rechargeable battery including an electrode assembly having a first electrode tab and a second electrode tab, a first current collection plate electrically connected to the first electrode tab, a case accommodating the electrode assembly and having a top-end opening, a cap assembly including a cap plate sealing the top-end opening of the case, a connecting pin located between the first current collection plate and the cap plate and electrically connecting the first current collection plate and the cap plate, and a first terminal unit electrically contacting the first current collection plate and upwardly protruding while passing through the cap plate.

The first current collection plate may be shaped of a plate and may include a first fuse driven at first current and a second fuse driven by second current, the first current and the second current being different from each other.

The first fuse may include a first fuse hole passing through the first current collection plate, and the second fuse may include a second fuse hole passing through the first current collection plate.

The first current may be greater than the second current.

The connecting pin may be connected between the first fuse and the second fuse in the first current collection plate.

The first current collection plate may further include a first terminal connection unit connected to the first terminal unit, a connecting pin connection unit connected to the connecting pin, and a first electrode tab connection unit connected to the first electrode tab. The connecting pin connection unit is provided between the first terminal connection unit and the first electrode tab connection unit.

In the first current collection plate, the first fuse may be positioned between the first terminal connection unit and the connecting pin connection unit, and the second fuse may be positioned between the connecting pin connection unit and the first electrode tab connection unit.

The cap assembly may further include an upper insulation member located between the first terminal unit and the cap plate and preventing the first terminal unit and the cap plate from contacting each other.

The rechargeable battery may further include a second current collection plate electrically connected to the second electrode tab, and a second terminal unit electrically contacting the second electrode tab and upwardly protruding while passing through the cap plate.

The rechargeable battery may further include an inversion plate provided under the second terminal unit, the inversion plate electrically connected to the cap plate and contacting the second terminal unit when an internal pressure of the case exceeds a preset pressure.

As described above, the rechargeable battery according to an embodiment of the present invention can be driven by different current levels and includes two fuses capable of preventing short-circuit current from flowing between the inside and the outside, thereby improving safety of the rechargeable battery.

In addition, the rechargeable battery according to an embodiment of the present invention can prevent short-circuit current from flowing to the outside of each of a plurality of rechargeable batteries connected to each other using a second fuse driven by a relatively low current level, thereby improving safety of the plurality of rechargeable batteries.

BRIEF DESCRIPTION OF THE DRAWINGS

The above and other features of the present invention will become more apparent by describing in detail exemplary embodiments thereof with reference to the attached drawings in which.

DETAILED DESCRIPTION

Figure 1A:
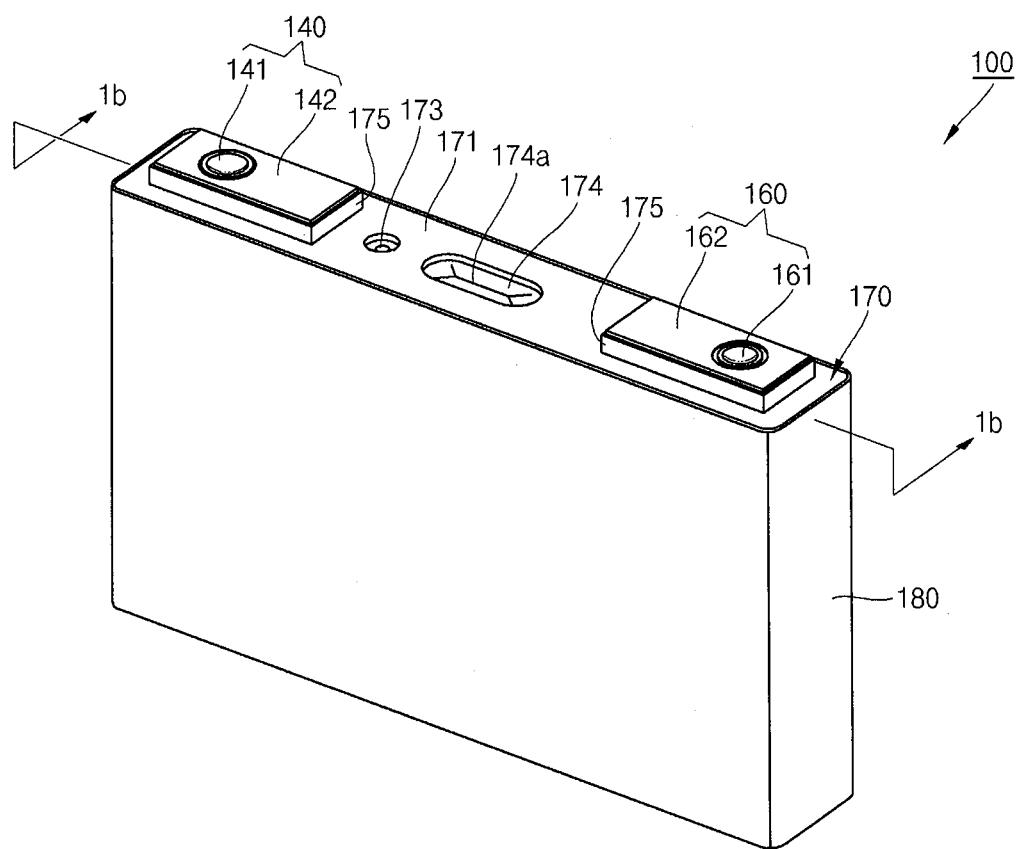
FIG. 1A is a perspective view of a rechargeable battery according to an embodiment of the present invention and FIG. 1B is a cross-sectional view taken along the line 1b-1b of FIG. 1A.

Hereinafter, exemplary embodiments of the present invention will be described with reference to the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art.

In the drawings, the thickness of layers and regions are exaggerated for clarity. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that, although the terms first, second, etc. may be used herein to describe various members, elements, regions, layers and/or parts, these members, elements, regions, layers and/or parts should not be limited by these terms. These terms are only used to distinguish one member, element, region, layer and/or part from another member, element, region, layer and/or part. Thus, for example, a first member, element, region, layer and/or part discussed below could be termed a second member, element, region, layer and/or part without departing from the teachings of the present invention.

Figure 1B:
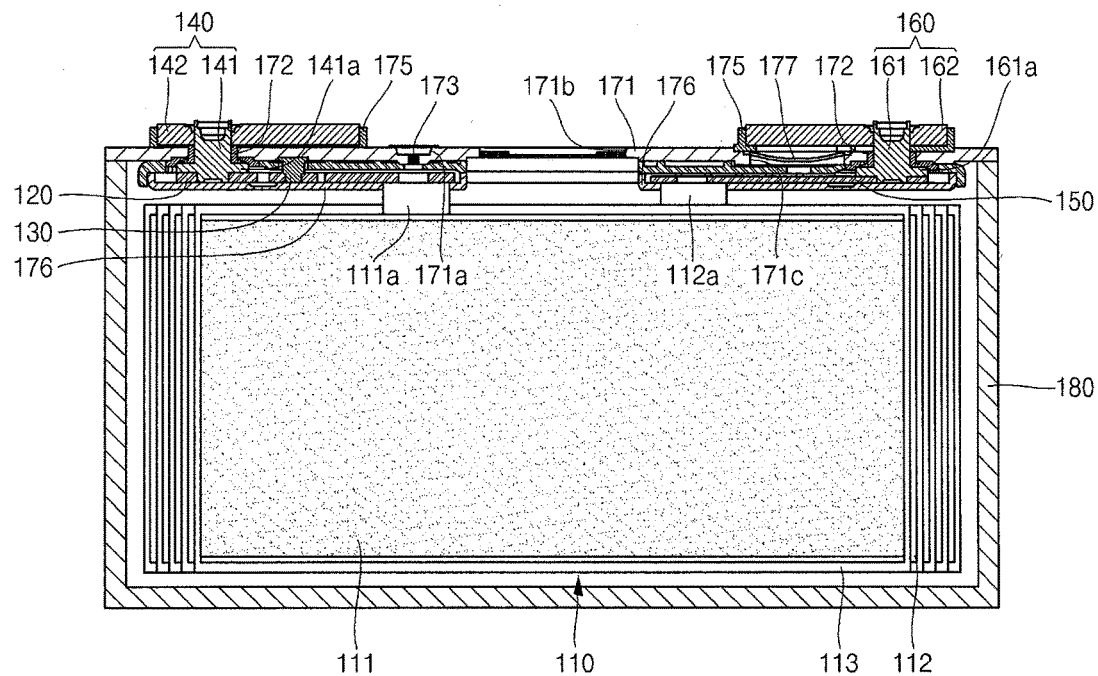
Figure 2:
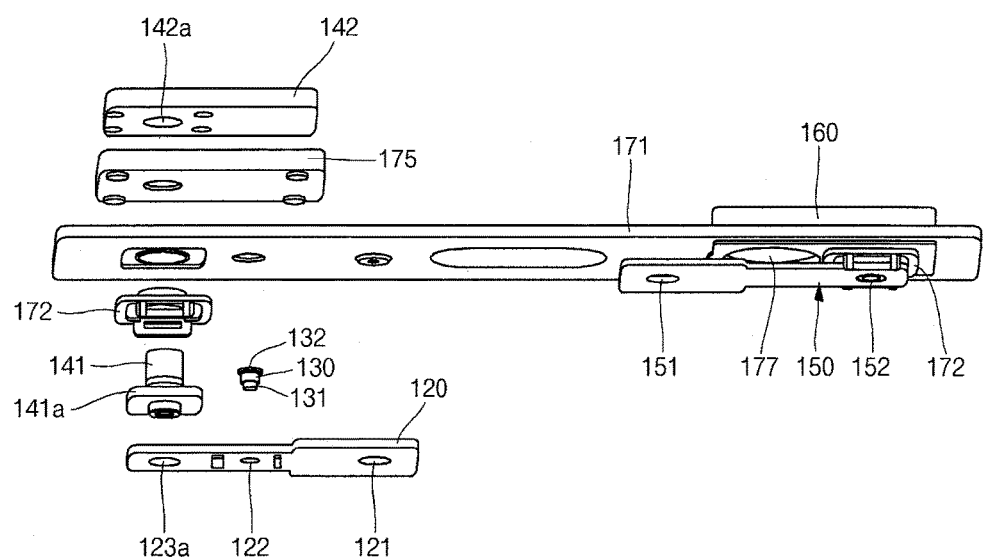
FIG. 2 is an exploded perspective view illustrating a cap assembly, a first terminal and a first current collector illustrated in FIG. 1A.

Referring to FIG. 1A, a perspective view of a rechargeable battery according to an embodiment of the present invention is illustrated. Referring to FIG. 1B, a cross-sectional view taken along the line 1b-1b of FIG. 1A is illustrated. Referring to FIG. 2, an exploded perspective view illustrating a cap assembly, a first terminal and a first current collector illustrated in FIG. 1A is illustrated. Hereinafter, the rechargeable battery according to an embodiment of the present invention will be described with reference to FIGS. 1A, 1B and 2.

As illustrated in FIGS. 1A and 1B, the rechargeable battery 100 includes an electrode assembly 110, a first current collection plate 120, a connecting pin 130, a first terminal unit 140, a second current collection plate 150, a second terminal unit 160, a cap assembly 170 and a case 180.

The electrode assembly 110 includes a first electrode plate 111, a second electrode plate 112 and a separator 113. The electrode assembly 110 may be formed by winding a stacked structure including the first electrode plate 111, the second electrode plate 112 and the separator 113 wound roughly in a jelly roll configuration or by sequentially stacking the first electrode plate 111, the separator 113 and the second electrode plate 112 in a rectangular parallelepiped configuration. In the electrode assembly 110, the first electrode plate 111 may function as a positive electrode and the second electrode plate 112 may function as a negative electrode, and vice versa.

The first electrode plate 111 may be formed by coating a first electrode active material on a metallic foil, e.g. aluminum foil, and may include a first electrode uncoated portion that is not coated with the first electrode active material. The first electrode uncoated portion upwardly protrudes from the electrode assembly 110 to become a first electrode tab 111a. In addition, the first electrode tab 111a may be a separate component connected to the first electrode uncoated portion of the first electrode plate 111. The first electrode tab 111a may provide a path of current flowing between the first electrode plate 111 and the outside of the electrode assembly 110. The first electrode tab 111a is coupled to the first current collection plate 120 to be electrically connected.

The second electrode plate 112 may be formed by coating a second electrode active material on a metallic foil, e.g. copper or nickel foil, and may include a second electrode uncoated portion that is not coated with the second electrode active material. The second electrode uncoated portion upwardly protrudes from the electrode assembly 110 to become a second electrode tab 112a. In addition, the second electrode tab 112a may be a separate component connected to the second electrode uncoated portion of the first electrode plate 112. The second electrode tab 112a may provide a path of current flowing between the second electrode plate 112 and the outside of the electrode assembly 110. The second electrode tab 112a is coupled to the second current collection plate 150 to be electrically connected.

The separator 113 may prevent an electric short between the first electrode plate 111 and the second electrode plate 112 and may allow lithium ions to pass. The separator 113 may be formed from, e.g., polyethylene (PE), polypropylene (PP) or a composite film of polyethylene (PE) and polypropylene (PP). The material of the separator 113 is not limited to those listed herein.

The electrode assembly 110 may be accommodated within the case 180 with an electrolyte through the top-end opening of the case 180 which may be sealed by the cap plate 171 of the cap assembly 170. Contact portions of the cap plate 171 and the case 180 may be coupled to each other by laser welding.

The first current collection plate 120 electrically connects the first electrode tab 111a and the first terminal unit 140 of the electrode assembly 110.

Figure 3:
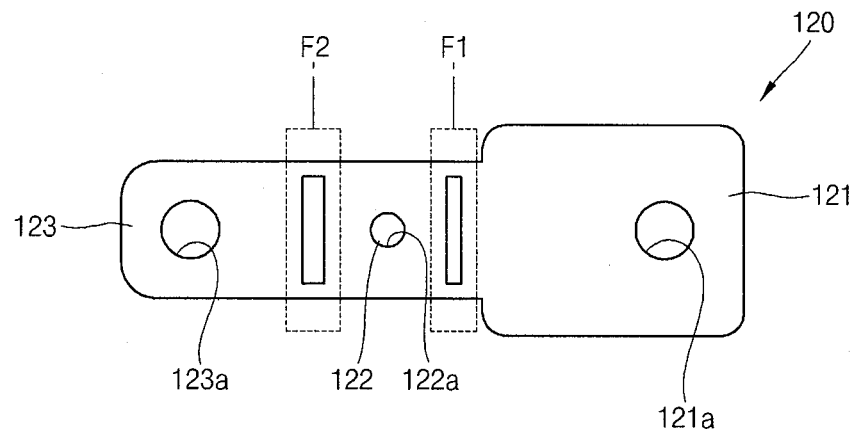
FIG. 3 is a plan view illustrating a first current collector illustrated in FIG. 1A.

Referring to FIG. 3, a plan view illustrating a first current collector illustrated in FIG. 1A is illustrated. A configuration of the first current collection plate 120 will now be described with reference to FIGS. 1A, 1B, 2 and 3.

The first current collection plate 120 is shaped of a plate and includes a first electrode tab connection unit 121 connected to the first electrode tab 111a, a connecting pin connection unit 122 connected to the connecting pin 130, and a first terminal connection unit 123 connected to the first terminal unit 140. In the first current collection plate 120, the connecting pin connection unit 122 may be positioned between the first electrode tab connection unit 121 and the first terminal connection unit 123. In addition, in the first current collection plate 120, a first fuse F1 is provided between the first electrode tab connection unit 121 and the connecting pin connection unit 122 and a second fuse F2 is provided between the connecting pin connection unit 122 and the first terminal connection unit 123. The first current collection plate 120 may be made of a conductive material, such as aluminum or an aluminum alloy. The first current collection plate 120 is shaped of a plate parallel with the cap plate 171 of the cap assembly 170 and is installed between the electrode assembly 110 and the cap plate 171.

The first electrode tab connection unit 121 may contact the first electrode tab 111a of the electrode assembly 110 and may be electrically connected to the first electrode plate 111. The first electrode tab connection unit 121 may include a first electrode tab hole 121a passing through between its top and bottom surfaces and may be welded to the first electrode tab 111a through the first electrode tab hole 121a to be electrically connected. In other words, the first electrode tab connection unit 121 is electrically connected to the electrode assembly 110 through the first electrode tab 111a.

The connecting pin connection unit 122 may be electrically connected to the connecting pin 130. The connecting pin connection unit 122 may include a connecting pin hole 122a passing through between its top and bottom surfaces. The connecting pin 130 electrically connected to the cap plate 171 is inserted into the connecting pin hole 122a to be coupled to each other. In other words, the connecting pin hole 122a may be shaped and sized to correspond to the connecting pin 130 to allow the connecting pin 130 to be accommodated therein. The connecting pin 130 may be inserted into and coupled to the first connecting pin hole 122a by laser welding.

The first terminal connection unit 123 may be electrically connected to the first terminal unit 140. The first terminal connection unit 123 includes a first terminal hole 123a passing through between its top and bottom surfaces. The first coupling terminal 141 of the first terminal unit 140 is inserted into and coupled to the first terminal hole 123a. In other words, the first terminal hole 123a may be shaped and sized to correspond to the first coupling terminal 141 to allow the first coupling terminal 141 to be accommodated therein. The first coupling terminal 141 may be inserted into and coupled to the first terminal hole 123a by laser welding.

The first fuse F1 is provided between the first electrode tab connection unit 121 and the connecting pin connection unit 122. The first fuse F1 includes a first fuse hole FH1 passing through between its top and bottom surfaces and has a smaller sectional area than other portions of the first current collection plate 120. The first fuse hole FH1 may be shaped of a rectangle elongated in a lengthwise direction of the first current collection plate 120, but aspects of the present invention are not limited thereto. When high current flows in the rechargeable battery 100 due to an electrical short occurring to the rechargeable battery 100, the first fuse F1 may be melted by instantaneous high heat, thereby preventing current from flowing between the first electrode tab connection unit 121 and the connecting pin connection unit 122. In other words, if the first fuse F1 is melted by the high current, it is possible to prevent the current from flowing between the electrode assembly 110 connected to the first electrode tab connection unit 121 and the cap plate 171 connected to the connecting pin connection unit 122 through the connecting pin 130.

The second fuse F2 is provided between the connecting pin connection unit 122 and the first terminal connection unit 123. The second fuse F2 includes a second fuse hole FH2 passing through between its top and bottom surfaces and has a smaller sectional area than other portions of the first current collection plate 120. The second fuse hole FH2 may be shaped of a rectangle elongated in a lengthwise direction of the first current collection plate 120, but aspects of the present invention are not limited thereto. When high current flows in the rechargeable battery 100 due to an electrical short occurring to the rechargeable battery 100, the second fuse F2 may be melted by instantaneous high heat, thereby preventing the current from flowing between the connecting pin connection unit 122 and the first terminal connection unit 123. In other words, if the second fuse F2 is melted by the high current, it is possible to prevent the current from flowing between the cap plate 171 connected to the connecting pin connection unit 122 through the connecting pin 130 and the first terminal unit 140 connected to the first terminal connection unit 123.

The first fuse F1 and the second fuse F2 may have different sectional areas and may be driven by different current levels. In one embodiment, the second fuse F2 may have a smaller sectional area than the first fuse F1. In other words, the second fuse hole FH2 may be larger than the first fuse hole FH1. Therefore, since the second fuse F2 is driven by a smaller amount of current than the first fuse F1, it is possible to prevent the current from flowing between the connecting pin connection unit 122 and the first terminal connection unit 123.

The connecting pin 130 is located between the first current collection plate 120 and the cap plate 171 and electrically connects the first current collection plate 120 and the cap plate 171. The connecting pin 130 may be a cylinder made of a conductive material. In addition, the connecting pin 130 may be a hexahedron, a sphere, and the like, so long as the cap plate 171 and the first current collection plate 120 are electrically connected to each other by the connecting pin 130, but the present invention does not limit the shape of the connecting pin 130 to those listed herein. The first connection unit 131 connected to the connecting pin connection unit 122 of the first current collection plate 120 is provided at one side of the connecting pin 130 and the second connection unit 132 connected to the cap plate 171 is provided at the other side of the connecting pin 130.

The first connection unit 131 of the connecting pin 130 provided in the first current collection plate 120 is inserted into the connecting pin hole 122a of the connecting pin connection unit 122, followed by laser welding. In addition, the second connection unit 132 may be coupled to the cap plate 171 by laser welding such that the second connection unit 132 is connected to a bottom surface of the cap plate 171. The connecting pin 130 electrically connects the first current collection plate 120 and the cap plate 171.

The first terminal unit 140 is made of a metal or an equivalent thereof and is electrically connected to the first current collection plate 120. The first terminal unit 140 includes a first coupling terminal 141 accommodated in the first terminal hole 123a of the first current collection plate 120 to be electrically coupled to the first terminal connection unit 123 and a first electrode terminal 142 coupled to the first coupling terminal 141.

The first coupling terminal 141 upwardly extends and protrudes through the cap plate 171 and is electrically connected to the first current collection plate 120 under the cap plate 171. While the first coupling terminal 141 upwardly extends and protrudes from the cap plate 171, a laterally extending flange 141a may be formed under the cap plate 171 to prevent the first coupling terminal 141 from being dislodged from the cap plate 171. A region of the first coupling terminal 141 disposed under the flange 141a may be inserted into the first terminal hole 123a of the first current collection plate 120 to then be riveted or welded. In addition, a region of the first coupling terminal 141 disposed on the flange 141a may upwardly extend and protrude through the cap plate 171 and the first electrode terminal 142 may be fixed to the extending and protruding region.

The first electrode terminal 142 is shaped of a plate having a first terminal hole 142a passing through its top and bottom surfaces. The first terminal hole 142a of the first electrode terminal 142 may be shaped and sized to correspond to the first coupling terminal 141 to allow the first coupling terminal 141 to be accommodated therein. The first coupling terminal 141 upwardly protruding from the cap plate 171 may be inserted into the first terminal hole 142a of the first electrode terminal 142 to then be riveted or welded. The first electrode terminal 142 may be prevented from electrically contacting the cap plate 171 by the upper insulation member 175 located between the bottom surface of the first electrode terminal 142 and the cap plate 171.

In other words, the first terminal unit 140 may not directly contact the cap plate 171 and may be electrically connected to the cap plate 171 through the first current collection plate 120 and the connecting pin 130. The first terminal unit 140 may be made of, for example, one selected from aluminum, an aluminum alloy and equivalents thereof, but the present invention does not limit the material of the first terminal unit 140 to those listed herein.

The second current collection plate 150 is shaped of a plate and includes a second electrode tab connection unit 151 connected to the second electrode tab 112a and a second terminal connection unit 152 connected to the second terminal unit 160. The second current collection plate 150 may be made of a conductive material selected from copper, a copper alloy and equivalents thereof. The second current collection plate 150 is shaped of a plate parallel with the cap plate 171 of the cap assembly 170 and is installed between the electrode assembly 110 and the cap plate 171.

The second electrode tab connection unit 151 may contact the second electrode tab 112a of the electrode assembly 110 and may be electrically connected to the second electrode plate 112. The second electrode tab connection unit 151 may include a second electrode tab hole 151a passing through between its top and bottom surfaces and may be welded to the second electrode tab 112a through the second electrode tab hole 151a to then be electrically connected. In other words, the second electrode tab connection unit 151 is electrically connected to the electrode assembly 110 through the second electrode tab 112a.

The second terminal connection unit 152 may be electrically connected to the second terminal unit 160. The second terminal connection unit 152 includes a second terminal hole 152a passing through between its top and bottom surfaces. The second coupling terminal 161 of the second terminal unit 160 is inserted into and coupled to the second terminal hole 152a. In other words, the second terminal hole 152a may be shaped and sized to correspond to the second coupling terminal 161 to allow the second coupling terminal 161 to be accommodated therein. The second coupling terminal 161 may be coupled to the second terminal hole 152a by laser welding in a state in which the second coupling terminal 161 is inserted into the second terminal hole 152a.

The second terminal unit 160 is made of a metal or an equivalent thereof and is electrically connected to the second current collection plate 150. The second terminal unit 160 includes a second coupling terminal 161 accommodated in the second terminal hole 152a of the second current collection plate 150 to be electrically coupled to the second terminal connection unit 152 and a second electrode terminal 162 coupled to the second coupling terminal 161.

The second coupling terminal 161 upwardly extends and protrudes through the cap plate 171 and is electrically connected to the second current collection plate 150 under the cap plate 171. While the second coupling terminal 161 upwardly extends and protrudes from the cap plate 171, a laterally extending flange 161a may be formed under the cap plate 171 to prevent the second coupling terminal 161 from being dislodged from the cap plate 171. A region of the second coupling terminal 161 disposed under the flange 161a may be inserted into the second terminal hole 152a of the second current collection plate 150 to then be riveted or welded. In addition, a region of the second coupling terminal 161 disposed on the flange 161a may upwardly extend and protrude through the cap plate 171 and the second electrode terminal 162 may be fixed to the extending and protruding region. In one embodiment, the second terminal unit 160 has substantially the same shape as the first terminal unit 140.

The cap assembly 170 is coupled to the case 180. In detail, the cap assembly 170 includes a cap plate 171, a seal gasket 172, a plug 173, a safety vent 174, an upper insulation member 175, a lower insulation member 176 and a short-circuit plate 177.

The cap plate 171 may seal the opening of the case 180 and may be made of a conductive metal, such as aluminum, an aluminum alloy or nickel plated steel. For example, the cap plate 171 may be coupled to the case 180 by laser welding. The cap plate 171 may be electrically connected to the first current collection plate 120 through the connecting pin 130 and may have the same polarity with the first current collection plate 120. Accordingly, the cap plate 171 and the case 180 may have the same polarity.

The seal gasket 172 made of an insulating material may be formed between each of the first coupling terminal 141 and the second coupling terminal 161 and the cap plate 171 and may seal a portion between each of first coupling terminal 141 and the second coupling terminal 161 and the cap plate 171. The seal gasket 172 may prevent external moisture from penetrating into the rechargeable battery 100 and may prevent an electrolyte contained in the rechargeable battery 100 from flowing out.

The plug 173 may seal an electrolyte injection hole 171a of the cap plate 171 and the safety vent 174 may be installed in the vent hole 171b of the cap plate 171. A notch 174a may be formed to be opened at a preset pressure.

The upper insulation member 175 may be located between the first electrode terminal 142 and the cap plate 171 and between the second electrode terminal 162 and the cap plate 171. The upper insulation member 175 may electrically insulate the first electrode terminal 142 from the cap plate 171 and may electrically insulate the second electrode terminal 162 from the cap plate 171. In addition, the upper insulation member 175 may contact the cap plate 171. Further, the upper insulation member 175 may also contact the seal gasket 172. The upper insulation member 175 may electrically insulate the first terminal unit 140 from the cap plate 171 and may electrically insulate the second terminal unit 160 from the cap plate 171. The first terminal unit 140 may not be directly connected to the cap plate 171 by the upper insulation member 175 but may be electrically connected to the cap plate 171 through the first current collection plate 120 and the connecting pin 130.

The lower insulation member 176 may be formed between each of the first current collection plate 120 and the second current collection plate 150 and the cap plate 171 and may prevent unnecessary electrical short from occurring therebetween. In other words, the lower insulation member 176 prevents an electrical short between the first current collection plate 120 and the cap plate 171 and an electrical short between the second current collection plate 150 and the cap plate 171. In addition, since the lower insulation member 176 is also formed between each of the first coupling terminal 141 and the second coupling terminal 161 and the cap plate 171, it is possible to prevent an electrical short between each of the first coupling terminal 141 and the second coupling terminal 161 and the cap plate 171.

The short-circuit plate 177 is located between the upper insulation member 175 and the cap plate 171 in a short-circuit hole 171c of the cap plate 171. The short-circuit plate 177 may be formed of an inversion plate including a downwardly convex round portion and an edge portion fixed to the cap plate 171. When an internal pressure of the rechargeable battery 100 exceeds a preset pressure by an over-charge, the short-circuit plate 177 may be inverted to upwardly convexly protrude. If the short-circuit plate 177 upwardly convexly protrudes, it may contact the second electrode terminal 162 disposed thereon, thereby causing an electrical short. If the electrical short is caused, a large amount of current may flow and heat is generated. In one embodiment, the first fuse F1 and the second fuse F2 of the first current collection plate 120 may be melted to function as fuses.

The case 180 and the cap plate 171 may be made of the same material. The case 180 may have a substantially hexahedral shape having an opening through which the electrode assembly 110, the first current collection plate 120, the connecting pin 130 and the second current collection plate 150 are inserted and placed. In FIGS. 1A and 1B, the case 180 and the cap assembly 170 are shown in an assembled state. Thus, the peripheral portion of the cap assembly 170 substantially corresponds to the opening of the case 180. In one embodiment, the interior surface of the case 180 is insulated, so that the case 180 is electrically insulated from the electrode assembly 110, the first current collection plate 120, the connecting pin 130, the second current collection plate 150 and the cap assembly 170.

Figure 4:
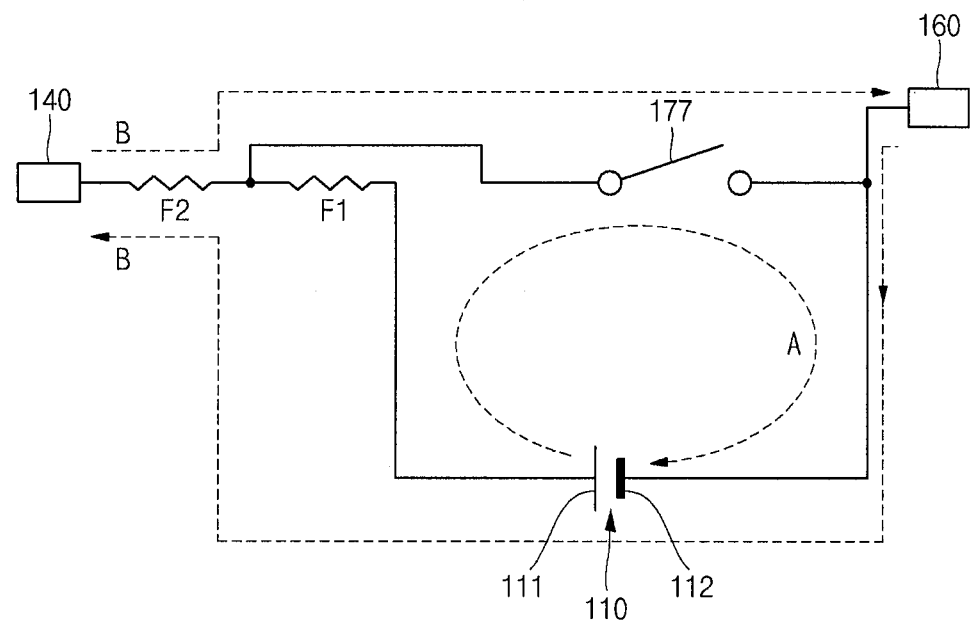
FIG. 4 is a circuit view of the rechargeable battery illustrated in FIGS. 1A and 1B.

Referring to FIG. 4, a circuit view of the rechargeable battery illustrated in FIGS. 1A and 1B is illustrated. As illustrated in FIG. 4, the circuit view of the rechargeable battery 100 may be implemented by the electrode assembly 110, the first fuse F1, the second fuse F2, the first terminal unit 140, the second terminal unit 160 and the short-circuit plate 177. Hereinafter, a circuit of the rechargeable battery 100 will be described with reference to FIGS. 1A, 1B and 4.

When an electrical short occurs to the short-circuit plate 177, the first fuse F1 is a fuse for preventing the flow of first short-circuit current A through the electrode assembly 110. In addition, the second fuse F2 is a fuse for preventing second short-circuit current B from flowing between the first terminal unit 140 and the second terminal unit 160. In other words, the first fuse F1 may be a fuse for preventing internal current from flowing in the rechargeable battery 100 and the second fuse F2 may be a fuse for preventing current from flowing to the outside of the rechargeable battery 100.

For example, in a case where two rechargeable batteries 100 are connected in parallel to each other and a short-circuit plate 177 of one of the two rechargeable batteries 100 is short-circuited, half of short-circuit current is applied to each of the two rechargeable batteries 100 due to parallel connection. In one embodiment, a second fuse F2 of each of the two rechargeable batteries 100 may be melted by half of the short-circuit current, thereby preventing the flow of current.

In addition, when second fuses F2 of two rechargeable batteries 100 are both melted and the current flowing between the two rechargeable batteries 100 is prevented, short-circuit current may flow through the rechargeable battery 100 having the short-circuit plate 177 short-circuited, so that the first fuse F1 may be melted, thereby preventing the flow of internally circulating current.

In other words, since the rechargeable battery 100 is driven by different current levels and includes two fuses capable of preventing short-circuit current from flowing between the inside and the outside of the rechargeable battery 100, the rechargeable battery 100 may have improved safety. In addition, with a configuration in which a plurality of rechargeable batteries 100 are connected in parallel to each other, short-circuit current flowing to the outside of each of the plurality of rechargeable batteries 100 can be cut off by a second fuse driven by a relatively low current level, thereby improving the safety of the rechargeable batteries 100 connected in parallel to each other.

While the rechargeable battery of the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A rechargeable battery comprising:
an electrode assembly having a first electrode tab and a second electrode tab;
a first current collection plate electrically connected to the first electrode tab wherein the first current collection plate includes a first fuse configured to be driven at first current a second fuse configured to be driven by a second current being different than the first current, a connecting pin hole, and a first terminal hole;
a case accommodating the electrode assembly;
a cap assembly including a cap plate sealing the top-end opening of the case;
a connecting pin directly coupled to the first current collection plate via the connecting pin hole and electrically connecting the first current collection plate and the cap plate;
a first terminal unit directly coupled to the first current collection plate via the first terminal hole and protruding through the cap plate; and
a lower insulation member located between the electrode assembly and the connecting pin.

2. The rechargeable battery of claim 1, wherein the first fuse includes a first fuse hole passing through the first current collection plate, and the second fuse includes a second fuse hole passing through the first current collection plate.

3. The rechargeable battery of claim 1, wherein the first current is greater than the second current.

4. The rechargeable battery of claim 1, wherein the connecting pin is connected between the first fuse and the second fuse in the first current collection plate.

5. The rechargeable battery of claim 1, wherein the first current collection plate further comprises:
a first electrode tab connection unit connected to the first electrode tab,
wherein the connecting pin connection hole is located between the first terminal connection unit and the first electrode tab connection unit.

6. The rechargeable battery of claim 5, wherein in the first current collection plate, the first fuse is positioned between the first terminal connection unit and the connecting pin connection unit, and the second fuse is positioned between the connecting pin connection unit and the first electrode tab connection unit.

7. The rechargeable battery of claim 1, wherein the cap assembly further comprises an upper insulation member located between the first terminal unit and the cap plate and configured to prevent the first terminal unit and the cap plate from contacting each other.

8. The rechargeable battery of claim 1, further comprising:
   a second current collection plate electrically connected to the second electrode tab; and
   a second terminal unit electrically contacting the second electrode tab and protruding through the cap plate.

9. The rechargeable battery of claim 8, further comprising an inversion plate provided under the second terminal unit, the inversion plate configured to be electrically connected to the cap plate and contact the second terminal unit when an internal pressure of the case exceeds a preset pressure.

* * * * *